United States Patent [19]

Gibler et al.

[11] Patent Number: 5,291,541

[45] Date of Patent: Mar. 1, 1994

[54] COUPLING APPARATUS FOR TELEPHONE HANDSETS

[75] Inventors: Clinton D. Gibler, Indianapolis; Larry A. Marcus, Fishers; Frederick A. Rosebrock, Greenfield; Perry K. White, Indianapolis, all of Ind.

[73] Assignee: AT&T Bell Laboratories, Murray Hill, N.J.

[21] Appl. No.: 992,312

[22] Filed: Dec. 21, 1992

[51] Int. Cl.$^5$ .......................................... H04M 11/00
[52] U.S. Cl. ........................................ 379/52; 379/99; 379/443
[58] Field of Search ............ 379/52, 99, 100, 440–444, 379/90, 110, 428

[56] References Cited

U.S. PATENT DOCUMENTS

| | | | |
|---|---|---|---|
| 3,100,818 | 8/1963 | Carter | 379/443 |
| 3,553,374 | 1/1971 | Wolf et al. | |
| 3,585,302 | 6/1971 | Swan, Jr. | |
| 3,700,814 | 10/1972 | Spraker | 379/444 |
| 3,746,793 | 7/1973 | Sachs et al. | 379/52 |
| 4,246,444 | 1/1981 | Mason | |
| 4,288,661 | 9/1981 | Krishan | |
| 4,415,769 | 11/1983 | Gray | 379/443 |
| 4,446,333 | 5/1984 | Kessler | |
| 4,736,411 | 4/1988 | Chan | 379/368 |
| 5,134,649 | 7/1992 | Gutzmer | 379/99 |

OTHER PUBLICATIONS

AT&T National Special Service Needs Center, TDD advertisement, Hearing Instruments vol. 37, No. 5, May 1986, p. 81.

Primary Examiner—Wing F. Chan
Attorney, Agent, or Firm—Michael A. Morra

[57] ABSTRACT

Coupling apparatus for a telephone handset comprises a handset-coupling cradle having a dome at one end thereof for locating the earpiece (receiver) of the handset, and sound ports at the other end of the cradle in the region where the mouthpiece (microphone) of the handset resides. The handset-coupling cradle is shaped to accommodate a variety of different handset styles. An inductive sensor is mounted within the dome and it responds to electromagnetic fields generated by the handset receiver. Such a sensor eliminates the need to closely couple the receiver to the apparatus. A low acoustic impedance loudspeaker is mounted beneath the sound ports for acoustically coupling signals to the handset's microphone. Such a loudspeaker eliminates the need to closely couple the microphone to the apparatus.

20 Claims, 4 Drawing Sheets

5,291,541

COUPLING APPARATUS FOR TELEPHONE HANDSETS

TECHNICAL FIELD

This invention relates generally to telephone handset couplers, and particularly to the design of a receiver cradle for use with handsets of various shapes.

BACKGROUND OF THE INVENTION

Portable data transmitting/receiving apparatus, such as a TDD (Telecommunications Device for the Deaf), is not always used in a location that permits convenient connection to the Public Switched Telecommunications Network (PSTN). Moreover, such apparatus can be made less expensive and more portable by eliminating dialing circuitry and other electrical equipment needed for interconnection with the PSTN. The idea of acoustically coupling signals between the apparatus and a conventional telephone handset has been around for many years to satisfy this need. However, one of the problems associated with acoustic coupling has been the inability to operate with a variety of different handset shapes and in various environments—including those where the ambient noise level is high.

Coupling efficiency between the handset and a handset-coupling device (cradle) on the apparatus has been improved by the use of compliant seals in the cradle that conform to the shape of the handset. Perhaps the most well-known seals used in such devices are rubber cups that are shaped to individually enclose the handset's mouthpiece and earpiece. Rubber cups are particularly well suited to seal certain handset shapes such as AT&T's model "G" handset which has circularly shaped mouthpiece and earpiece regions. The rubber cups not only reduce ambient noise, but they also provide a sealed enclosure similar to the one created when the receiver is held tightly against the user's ear. This sealed enclosure provides the proper acoustic impedance match for conventional receivers which is needed for signal coupling efficiency—otherwise acoustic signals are degraded.

Over the years, telephone handset shapes have proliferated to such a degree that many no longer fit into the rubber cups that cooperate so well with "G" handsets. Additionally, users have complained that the rubber cups form such good seals with "G" handsets that they are quite difficult to insert and remove.

Accordingly, it is desirable to provide a cradle for coupling signals between a telephone handset and a data terminal, or similar equipment, that improves existing acoustic coupling techniques. It is also desirable that the cradle be suitable for a variety of handset sizes and shapes. Finally, it is desirable that the cradle allow easy insertion and removal of the telephone handset.

SUMMARY OF THE INVENTION

In accordance with the invention, a coupling apparatus for telephone handsets comprises a handset-coupling cradle having a dome at one end thereof for locating the receiver of the handset. An inductive coil is mounted within the dome that responds to electromagnetic fields generated by the handset receiver. By providing an inductive sensor, the need for a sealed enclosure with the receiver is eliminated. A loudspeaker is mounted beneath sound ports in the cradle for acoustically coupling signals to the handset's microphone. The loudspeaker has relatively low acoustic impedance, so the need for a sealed enclosure with the microphone is eliminated.

In an illustrative embodiment of the invention, the handset-coupling cradle comprises a rigid structure in which the relative positions of the convex dome and the sound ports are fixed with respect to each other. Advantageously, the cradle is shaped to accommodate a number of different handset styles and avoids the need for a flexible connection between its opposite ends. The coupling apparatus may function as a stand-alone device or be incorporated in communication equipment such as a Telecommunications Device for the Deaf (TDD).

In the illustrative embodiment, a TDD is shown incorporating the coupling apparatus to facilitate insertion and removal of a telephone handset. The coupling apparatus used with the TDD includes both the inductive coil and the low acoustic impedance loudspeaker so that the need for rubber cups and the like (used in traditional acoustic coupling devices) is no longer necessary.

BRIEF DESCRIPTION OF THE DRAWING

The invention and its mode of operation will be more clearly understood from the following detailed description when read with the appended drawing in which.

DETAILED DESCRIPTION

Figure 1:
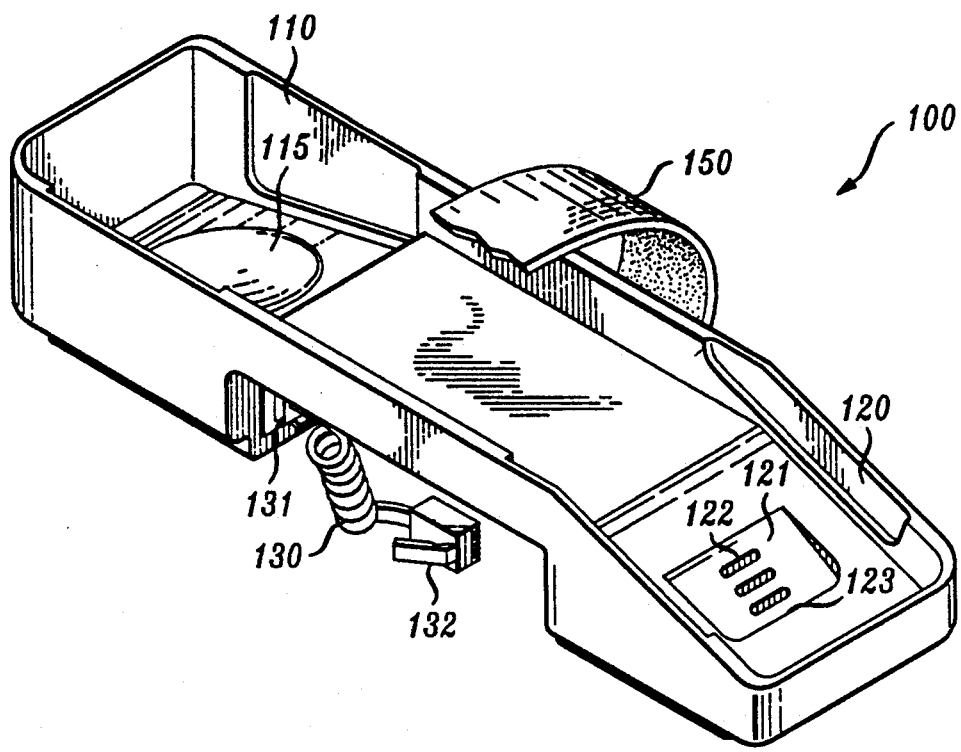
FIG. 1 is a perspective view of a coupling apparatus for telephone handsets in accordance with the present invention.

FIG. 1 discloses a perspective view of a coupling apparatus for telephone handsets in accordance with the present invention. In particular, the coupling apparatus 100 comprises a cradle which is shaped to accommodate a number of differently shaped handsets conveniently therein. Grooves 110, 120 are included in the sidewalls of the cradle to allow wider telephone handsets such as AT&T's Trimline ® telephone to be used. Additionally, the portion of the cradle which couples the handset mouthpiece includes a depressed region 121 and a locating ramp 123 for accommodating shapes similar to AT&T's R-type handsets (see e.g., FIG. 6). Acoustic sound ports 122 extend through the top surface of the cradle in region 121 so that sound waves can easily pass through. For convenience, a Velcro ® fastener 150 is provided to securely hold any handset to the cradle. More importantly, a dome 115, having a generally hemispheric shape, is used as a locating means for positioning the earpiece of a telephone handset in a predetermined location. This is important for two reasons: (1) An inductive pickup coil is mounted beneath the dome which responds to a magnetic field that is produced by the telephone receiver, so it must be properly located for optimum coupling; and (2) Because most telephone handsets are designed to have substantially the same distance between their earpiece and mouthpiece, when the earpiece is properly positioned, the mouthpiece is also. Therefore, the dome 115 is critical to the proper positioning of the handset within the cradle.

Coupling apparatus 100 may be an integral part of data equipment such as a Telecommunication Device for the Deaf (TDD) or it may function as a stand-alone device. Nevertheless, electrical equipment within apparatus 100 requires connection to external electrical equipment, and this is provided via cord 130 which terminates at one end in modular plug 131 and at the other end in modular plug 132.

Figure 2:
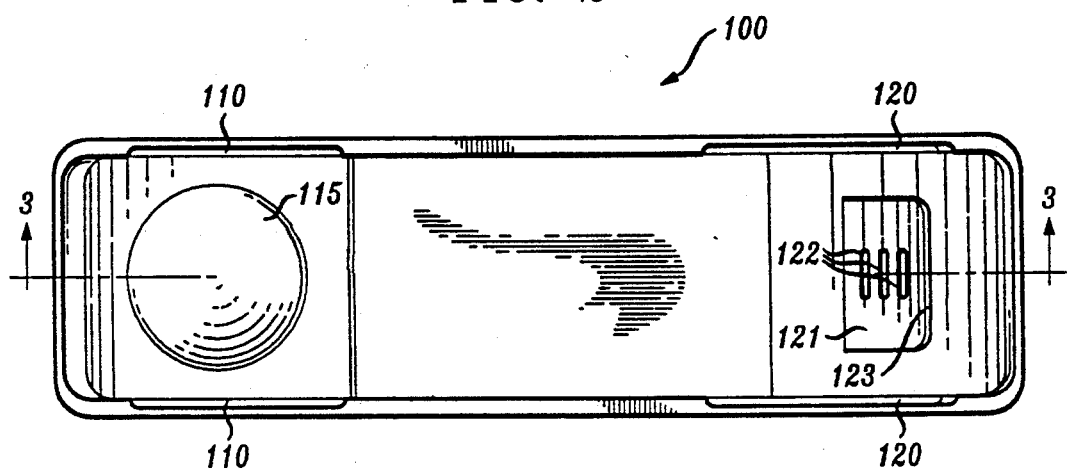
FIG. 2 is a top plan view of the coupling apparatus shown in FIG. 1.
Figure 3:
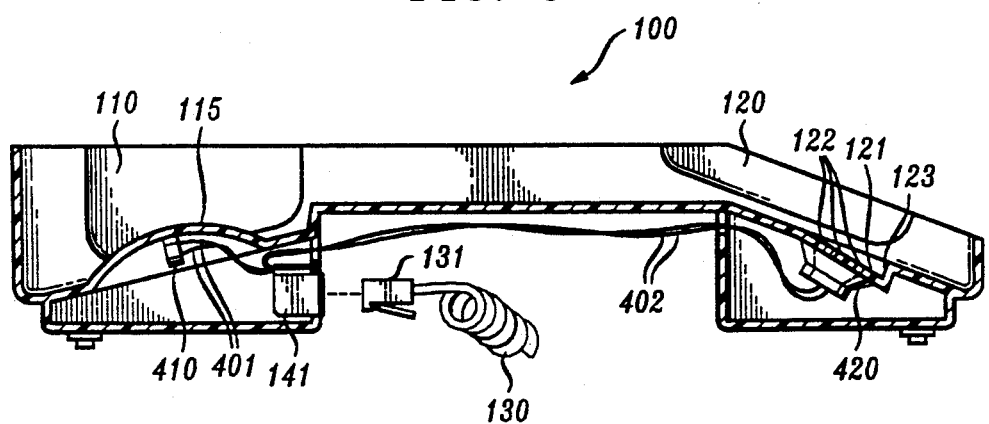
FIG. 3 is a cross section view of the coupling apparatus of FIG. 2 showing the placement of important components.

FIG. 2 is a top plan view of coupling apparatus 100 which provides greater detail regarding its construction. More revealing, however, is a cross section view of the FIG. 2 apparatus which is shown in FIG. 3. Significantly, acoustic coupling is not used for the coupling of signals between the receiver of an inserted telephone handset and coupling apparatus 100. Instead, an inductive pickup coil 410 is advantageously used for the following reasons: (1) Nearly all telephone handset receivers generate a magnetic field (in addition to acoustic sounds) which can be picked up by coil 410; and (2) the need for a tight seal to eliminate acoustic background noise and to provide high acoustic impedance for the handset's receiver is no longer necessary.

Inductive pickups, such as coil 410, have been used for years in hearing aids; and as recently as August, 1988, Public Law 100-394 entitled "Hearing Aid Compatibility Act of 1988" required that "all telephones manufactured in the United States (other than for export) . . . or imported for use in the United States . . . provide internal means for effective use with hearing aids." Long before such compatibility became law, AT&T used electromagnetic transducers (known as MR-type receivers) in its telephone handsets to provide improved coupling to hearing aids. The design of the MR-type receiver is disclosed in U.S. Pat. No. 4,443,667 which issued in April, 1984. It is, therefore, possible to rely on magnetic coupling between conventional handset receivers and coil 410 of the present invention.

Inductive pickups have also been used in amplifiers such as Archer's Catalog No. 43-229 Portable Telephone Amplifier which straps to the receiver of a telephone handset. This device senses the electromagnetic field generated by the receiver and converts it into an electrical signal, amplifies the electrical signal, and uses the amplified signal to drive a loudspeaker.

Figure 5:
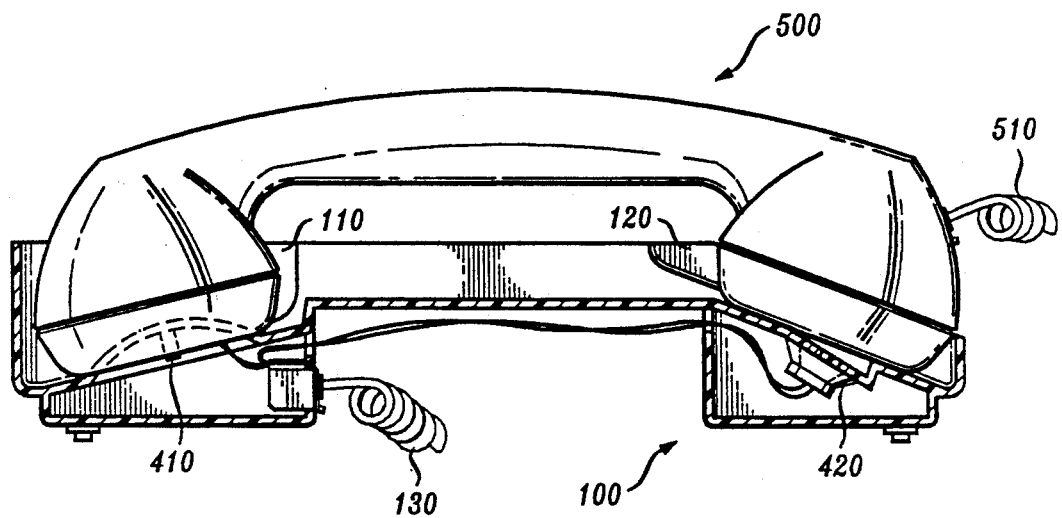
FIG. 5 illustrates the use of the subject coupling apparatus together with a conventional G-type telephone handset showing their relative positioning during normal use.
Figure 6:
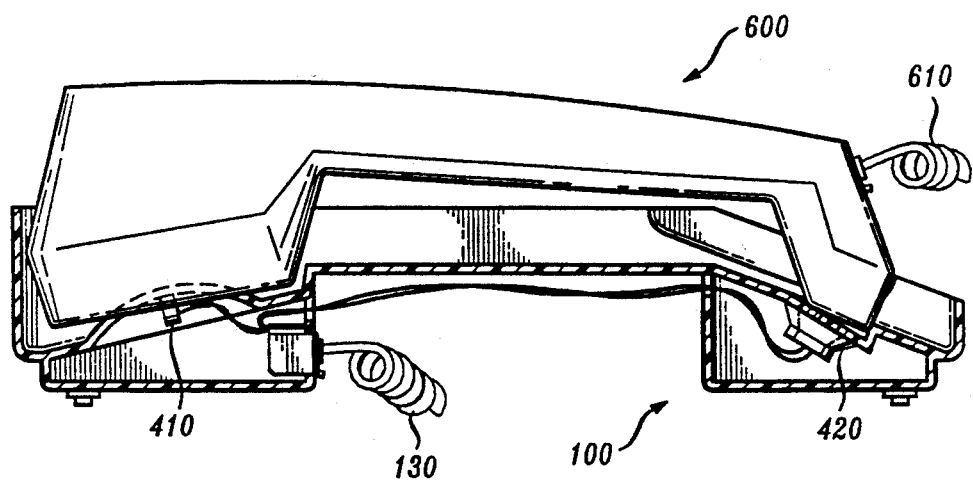
FIG. 6 illustrates the use of the subject coupling apparatus together with a conventional R-type telephone handset showing their relative positioning during normal use.

Referring once again to FIG. 3, it is noted that coil 410 is illustratively mounted to the inside surface of dome 115. In the present invention, epoxy is used to provide suitable adhesion although the inside surface of the dome may be molded to include a coil-holding means. It is noted that the coil is not positioned at the very center of the dome because the symmetry of the magnetic fields created by the handset receiver minimize signal strength at this point. Rather, the coil 410 is mounted approximately ¼ inch from the center. Nevertheless, its optimum positioning varies according to the shape of the dome and the particular telephone handset used. A small amount of experimentation is needed to select a satisfactory location. By way of illustration, and not limitation, the coil used in the present invention is the Y01-01-EFL Telephone Pickup Coil which is commercially available from Tibbetts Industries. This coil is cylindrically shaped and has a maximum length of 6.55 mm and a maximum diameter of 2.29 mm. Additionally, it has a DC resistance of 900 ohms, and an inductance of 140 mh (measured at 1 kHz). Coil 410 connects to modular jack 141 via wire pair 401. Illustratively, an RJ-11 modular jack is used which is available from a number of vendors of telephone accessory products. Jack 141 provides easy access to the microphone and speaker transducers from external electrical equipment. Access is accomplished via electrical cord 130 which is terminated in modular plug 131. Modular plugs and jacks for communication products are well known and specified in detail in Subpart F of FCC Part 68.500 Registration Rules. Also connected to jack 141 is wire pair 402 which connects to speaker 420. Sound ports 122 enable sound waves emanating from the speaker 420 to be coupled to the microphone of a telephone handset when positioned as shown in FIGS. 5 and 6.

At this point it is noted that use of pickup coil 410 eliminates the need for a flexible seal, such as a rubber cup, at the receiver end of the telephone handset. In the preferred embodiment of the invention, it is desirable to also eliminate the need for a flexible seal at the microphone end of the telephone handset. This is partially achieved by the use of dome 115 which accurately positions the handset receiver, and thus accurately positions the handset microphone over sound ports 122 for practically all telephone handsets. This is because the distance between the receiver and the microphone of most telephone handsets is substantially constant, and anything that positions the receiver accurately also positions the microphone accurately.

Low Acoustic Impedance Speakers

A convenient parameter for distinguishing a low acoustic impedance speaker is its resonant frequency. Generally, a speaker having a resonant frequency that is less than 600 Hz is said to have a low acoustic impedance. Similarly, a speaker having a resonant frequency that is greater than 600 Hz is said to have a high acoustic impedance. Telephone handsets typically use high acoustic impedance speakers whose resonant frequency is in the range of 800 Hz, and whose frequency response (measured in decibels of sound pressure level) varies significantly depending upon whether its output is coupled to a large or a small air volume. In particular, the open-air frequency response of a typical handset receiver exhibits a considerable loss of energy at low frequencies, and therefore does not provide acceptable fidelity for the task of converting electrical signals into sound waves. However, when the output of the receiver is sealed within a small air volume, such as formed between the receiver and the user's ear, the frequency response is generally flat over the frequency band 300-3000 Hz which is suitable for intelligible speech. Since the present invention seeks to eliminate the need for tightly sealing the speaker 420 to the handset microphone, while still providing acceptable fidelity, speaker 420 is selected to be a low acoustic impedance device which is not conventional in the art.

One of the problems associated with the use of a low acoustic impedance speaker is the need to provide shunt acoustic ports to the room environment. Such porting allows sound energy to radiate into the room which compromises listening privacy. Similarly, the ports allow ambient room noise to couple with the signal, and this reduces the signal-to-noise ratio. In the present invention, this is only a minor concern because speaker 420 delivers frequency-shift-keyed, data signals to the handset microphone for transmission over the telephone network. Such signals are fairly robust with respect to additive noise and cannot be understood when they are overheard. One suitable device is a dynamic mylar speaker DSH303SC which is commercially available from Merry Electronic Co., Ltd. and has a resonance frequency of 200±40 Hz.

Telecommunications Device for the Deaf

Figure 4:
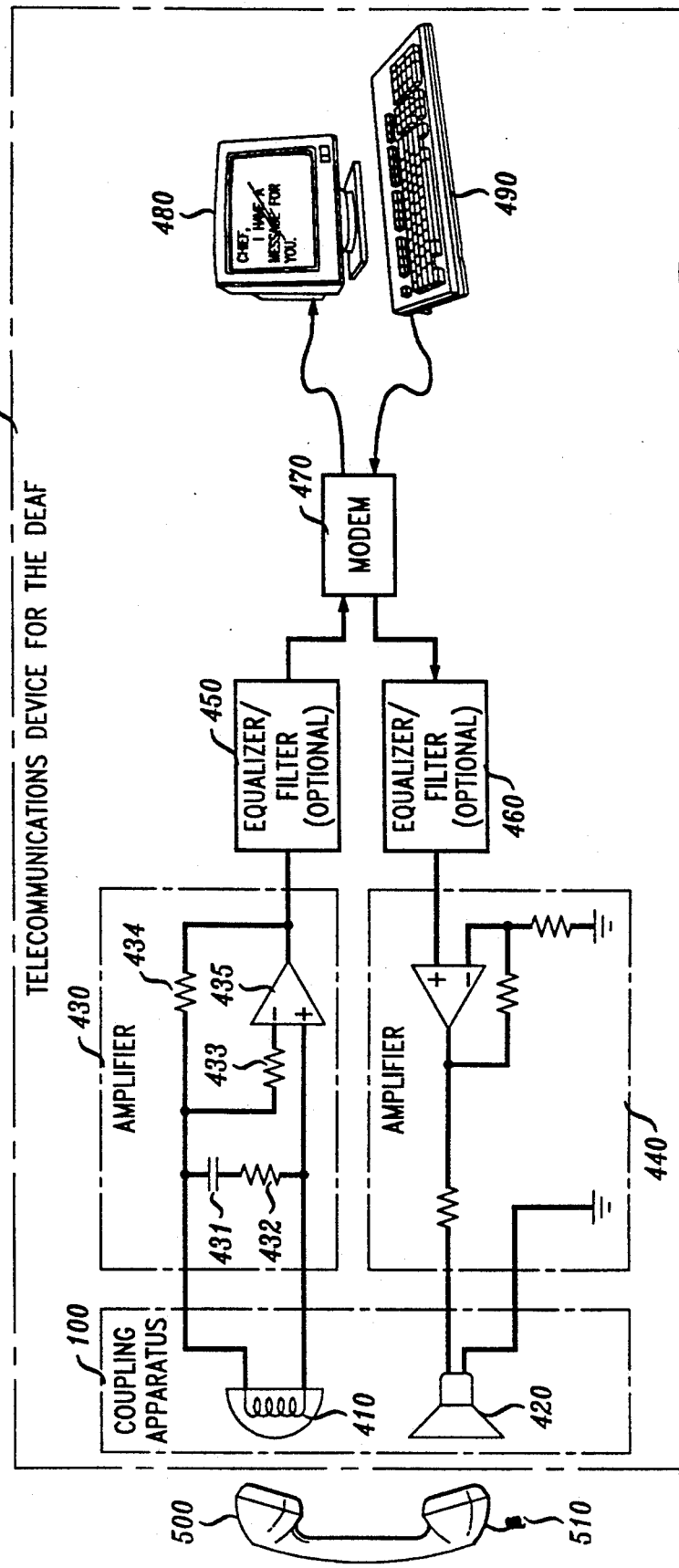
FIG. 4 is a block diagram showing the major functional components of a Telecommunications Device for the Deaf (TDD)

Referring now to FIG. 4, a block diagram shows the major functional components of a Telecommunications Device for the Deaf(TDD) 400. TDDs are devices that allow hearing impaired persons to communicate over a communications network such as the Public Switched Telecommunications Network (PSTN). And while many hearing-impaired persons are fully capable of speaking, FIG. 4 shows a TDD 400 where the user need not be capable of speech. In this regard, keyboard 490 responds to each key pressed by delivering a BAUDOT or ASCII data character to modem 470. Such data characters are well known by those in the art of TDD design, and comprise a sequence of binary digits which uniquely identifies the particular key that was pressed. Similarly, display 480 receives a BAUDOT or ASCII data character from the modem 470, decodes the character into an alphanumeric symbol, and visually displays it on a screen. Although display 480 is shown as conventional cathode ray tube, such screens are typically liquid crystal or vacuum fluorescent devices.

The modulator portion of modem 470 converts input digital signals from keyboard 490 into output analog signals suitable for transmission over the PSTN. The demodulator portion of modem 470 converts input analog signals from the PSTN into output digital signals to be shown on display 480. Because the PSTN is designed to carry voice signals in the frequency range 300-3000 Hz, modem 470 transmits and receives signals in this frequency range. A number of manufacturers already supply modem chips (Bell 103-type data set compatible) which simultaneously transmit and receive information, using FSK (frequency shift keying) signals in the proper frequency band, that are entirely suitable in this application. Modulation schemes other than FSK may be used in this application, and while FSK may be the least expensive, higher speeds may be needed and this would most likely require the use of another form of modulation. For example, U.S. Pat. No. 4,228,661 discloses an acoustic coupler that uses QAM (quadrature amplitude modulation). This patent teaches specially designed filters and equalizers to compensate for amplitude distortion created by the use of an acoustic coupler with an ordinary telephone handset. Because the present invention applies to QAM and other modulation schemes, equalizer/filter 450 and 460 are shown, although they are not required in connection with low speed FSK modulation.

Low acoustic impedance speaker 420 is driven by amplifier 440 which is of conventional design. Amplifier 430 is designed to operate with an input from pickup coil 410 and, although relatively conventional in design, its component values are listed below:

capacitor 431—0.18 microfarads
resistor 432—900 ohms
resistor 433—20K ohms
resistor 434—5.6M ohms Device 435 is a conventional differential amplifier and, together with the components used, provides approximately 45 dB of gain to electrical signals picked up by coil 410.

Finally, a G-type handset 500 is shown coupled to the coil 410 and speaker 420 within coupling apparatus 100. Telephone cord 510 is shown for the purpose of orienting the reader of this patent as to where the mouthpiece and earpiece of handset 500 are located.

FIG. 5 illustrates the use of the subject coupling apparatus 100 together with a conventional G-type telephone handset 500 showing their relative positioning during normal use. Cord 510 clarifies which end of the handset carries the microphone.

FIG. 6 illustrates the use of the subject coupling apparatus 100 together with a conventional R-type telephone handset 600 showing their relative positioning during normal use. Cord 610 clarifies which end of the handset carries the microphone.

Although a particular embodiment of the invention has been shown and described, various modifications are possible within the spirit and scope of the invention. In particular, it is understood that circuitry, in addition to the inductive pickup coil and speaker, can be mounted within the coupling apparatus; that the use of reactive sensors other than inductive coils is possible, so the term "electromagnetic field" is intended to include magnetic fields and electrostatic fields; and that the coupling apparatus of the present invention may be readily incorporated into equipment other than TDDs.

We claim:

1. Apparatus for coupling signals between communications equipment and a telephone handset, said handset including a receiver mounted at one end thereof and a microphone mounted at the other, the apparatus comprising a convex dome at one end of a handset-coupling surface for cooperating with the receiver to position the telephone handset on the surface, said convex dome including a reactive sensor mounted therein for sensing electromagnetic fields generated by the receiver; the apparatus further including a loudspeaker mounted beneath at least one sound aperture at the other end of the handset-coupling surface for coupling acoustic sounds to the microphone; whereby the coupling of acoustic sounds and electromagnetic fields to and from a telephone handset is achieved.

2. The apparatus of claim 1 wherein the handset-coupling surface comprises a rigid structure in which the positions of the convex dome and the sound apertures are fixed relative to each other.

3. The apparatus of claim 1 wherein the speaker has a resonant frequency that is less than 600 Hz; whereby the efficient coupling of signals from the speaker to the telephone handset's microphone is achieved without the need for an impedance-matching, sealed enclosure.

4. The apparatus of claim 1 wherein the reactive sensor comprises an inductive coil.

5. The apparatus of claim 1 wherein the convex dome is hemispherically shaped.

6. A telecommunications device for the deaf(TDD) comprising:

coupling apparatus including a telephone handset-coupling cradle having a convex dome in a first region thereof for positioning a receiver of a telephone handset, the convex dome including a reactive sensor mounted therein for sensing electromagnetic fields generated by the receiver and converting same into a corresponding electrical signal, said coupling apparatus including a second region having a loudspeaker mounted beneath one or more sound apertures for communicating acoustic sounds to a microphone at the other end of the telephone handset;

demodulator means for converting the corresponding electrical signal into a digital signal; and display means, responsive to the digital signal, for providing a visual representation of same.

7. The TDD of claim 6 wherein the handset-coupling cradle comprises a rigid surface surrounded by upwardly extending sidewalls for constraining the movement of a telephone handset placed therein.

8. The TDD of claim 6 further comprising:

keyboard means including a plurality of individual keys, which when actuated generate data characters representative of the pressed key;

modulator means for converting said data characters into analog signals suitable for transmission over a telecommunications network; and means interconnecting the analog signals to the speaker mounted within the coupling apparatus.

9. The TDD of claim 8 wherein the analog signal comprises a frequency shift keyed signal.

10. The TDD of claim 6 wherein the corresponding electrical signal comprises a frequency shift keyed signal.

11. The TDD of claim 6 wherein the reactive sensor comprises an inductive coil.

12. In combination, a telephone handset and a handset-coupling cradle for communicating electromagnetic and acoustic signals therebetween, the telephone handset comprising:

an earpiece region having an exterior surface which is concave in shape and which includes a receiver transducer that converts input electrical signals into output electromagnetic fields;

a mouthpiece region which includes a microphone transducer which converts input acoustic sounds into output electrical signals;

the handset-coupling cradle comprising:

an earpiece-coupling region having an exterior surface that is convex in shape for mating with the concave surface of the telephone handset;

a reactive sensor, mounted directly beneath said convex surface, that is responsive to the electromagnetic fields generated by the receiver transducer of the telephone handset;

a mouthpiece-coupling region having an exterior surface that includes acoustic sound ports which enable sound waves to pass therethrough; and a speaker transducer, mounted directly beneath said acoustic sound ports, for communicating acoustic sounds to the microphone transducer of the telephone handset.

13. The combination of claim 12 wherein the reactive sensor comprises an inductive coil, and wherein the earpiece-coupling region comprises a hemispherically shaped dome.

14. A handset-coupling cradle for coupling signals between data communication equipment and a telephone handset residing within the cradle

CHARACTERIZED BY:

acoustic coupling means for generating sound waves representing information signals from the data communication equipment, said acoustic coupling means comprising a loudspeaker mounted beneath at least one sound aperture in an external surface of the cradle and located at one end thereof;

handset locating means for properly positioning the telephone handset within the cradle, said locating means comprising a convex dome in the external surface of the cradle and located at the other end thereof; and electrical coupling means for sensing electromagnetic field changes generated by a receiver in the telephone handset, said electrical coupling means comprising an inductive coil mounted beneath the convex dome.

15. The handset-coupling cradle of claim 14 wherein the loudspeaker of the acoustic coupling means has a resonant frequency that is less than 600 Hz.

16. The handset-coupling cradle of claim 14 wherein the cradle includes sidewalls that extend upwardly therefrom, and completely surround, its external surface, said sidewalls functioning to reduce movement of the telephone handset.

17. The handset-coupling cradle of claim 16 wherein the sidewalls are contoured at predetermined locations to accommodate coupling a plurality of different telephone handset shapes.

18. The handset-coupling cradle of claim 14 further including electrical connection means comprising an electrical jack for enabling the cradle to be removably connected to communication equipment.

19. The handset-coupling cradle of claim 14 further including handset-fastening means comprising a strap which laterally extends around the external surface of the cradle.

20. The handset-coupling cradle of claim 14 wherein the convex dove is hemispherically shaped.

* * * * *